United States Patent
Heller et al.

(10) Patent No.: US 8,332,614 B2
(45) Date of Patent: Dec. 11, 2012

(54) SYSTEM, METHOD AND COMPUTER PROGRAM PRODUCT FOR PROVIDING A PROGRAMMABLE QUIESCE FILTERING REGISTER

(75) Inventors: Lisa C. Heller, Rhinebeck, NY (US); Harald Boehm, Schoenaich (DE); Ute Gaertner, Schoenaich (DE); Jennifer A. Navarro, Poughkeepsie, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/372,603

(22) Filed: Feb. 14, 2012

(65) Prior Publication Data

US 2012/0144154 A1 Jun. 7, 2012

Related U.S. Application Data

(63) Continuation of application No. 12/037,808, filed on Feb. 26, 2008, now Pat. No. 8,140,834.

(51) Int. Cl.
*G06F 12/10* (2006.01)
(52) U.S. Cl. ........................................ 711/207
(58) Field of Classification Search .................. 711/207
See application file for complete search history.

(56) References Cited

U.S. PATENT DOCUMENTS

| | | |
|---|---|---|
| 4,792,895 A | 12/1988 | Tallman |
| 4,843,541 A | 6/1989 | Bean et al. |
| 5,222,215 A | 6/1993 | Chou et al. |
| 5,317,705 A | 5/1994 | Gannon et al. |
| 5,381,535 A | 1/1995 | Gum et al. |
| 5,428,757 A | 6/1995 | Sutton |
| 5,530,820 A | 6/1996 | Onodera |
| 5,555,414 A | 9/1996 | Hough et al. |
| 5,574,878 A | 11/1996 | Onodera et al. |
| 5,574,936 A | 11/1996 | Ryba et al. |
| 5,652,853 A | 7/1997 | Duvalsaint et al. |
| 6,119,219 A | 9/2000 | Webb et al. |
| 6,378,027 B1 | 4/2002 | Bealkowski et al. |
| 6,453,392 B1 | 9/2002 | Flynn, Jr. |
| 6,493,741 B1 | 12/2002 | Emer et al. |
| 6,604,185 B1 | 8/2003 | Fromm |

(Continued)

OTHER PUBLICATIONS

U.S. Appl. No. 12/037,887 Final Office Action dated Dec. 9, 2010.

(Continued)

*Primary Examiner* — John Lane
(74) *Attorney, Agent, or Firm* — Cantor Colburn LLP; John Campbell

(57) ABSTRACT

Storing translation lookaside buffer (TLB) entries are in a TLB1 at the processor. The TLB1 includes entries associated with main storage accesses of programs executing in a guest mode in a current zone and entries associated with main storage accesses of firmware executing in a host mode. A quiesce interruption request is received at the processor that includes a requesting zone indicator. The processor is either executing in the host mode and has no zone or in the guest mode with the current zone. The requesting zone indicator and the contents of a programmable filtering register that indicates exceptions to filtering performed by the processor is used to determine if filtering should be performed. The quiesce interruption request may be filtered based on the requesting zone indicator even after the mode switches from the guest mode to the host mode.

20 Claims, 7 Drawing Sheets

U.S. PATENT DOCUMENTS

| | | |
|---|---|---|
| 6,671,795 B1 | 12/2003 | Marr et al. |
| 6,728,746 B1 | 4/2004 | Murase et al. |
| 6,959,352 B1 | 10/2005 | Dickey |
| 7,234,037 B2 | 6/2007 | Errickson et al. |
| 7,321,369 B2 | 1/2008 | Wyatt et al. |
| 2002/0052914 A1 | 5/2002 | Zalewski et al. |
| 2002/0083258 A1* | 6/2002 | Bauman et al. ............... 710/311 |
| 2003/0009648 A1 | 1/2003 | Doing et al. |
| 2003/0027178 A1 | 2/2003 | Vasmatzis et al. |
| 2003/0037089 A1 | 2/2003 | Cota-Robles et al. |
| 2004/0230976 A1 | 11/2004 | Slegel et al. |
| 2005/0102670 A1 | 5/2005 | Bretl et al. |
| 2005/0114855 A1 | 5/2005 | Baumberger |
| 2005/0223005 A1 | 10/2005 | Shultz et al. |
| 2006/0036824 A1 | 2/2006 | Greiner et al. |
| 2006/0259710 A1 | 11/2006 | Gimpl et al. |
| 2006/0259818 A1 | 11/2006 | Howell et al. |
| 2007/0050764 A1 | 3/2007 | Traut |
| 2007/0067775 A1 | 3/2007 | Shultz et al. |
| 2007/0089111 A1 | 4/2007 | Robinson et al. |
| 2007/0113217 A1 | 5/2007 | Gish et al. |
| 2007/0157198 A1 | 7/2007 | Bennet et al. |
| 2008/0046885 A1 | 2/2008 | Shultz et al. |
| 2008/0086729 A1 | 4/2008 | Kondoh et al. |
| 2009/0216963 A1 | 8/2009 | Greiner |
| 2009/0216995 A1 | 8/2009 | Heller |
| 2009/0217264 A1 | 8/2009 | Heller |
| 2009/0217269 A1 | 8/2009 | Heller et al. |

OTHER PUBLICATIONS

U.S. Appl. No. 12/037,887 Non Final Office Action dated Jun. 14, 2010.

U.S. Appl. No. 12/037,808 Final Office Action dated Sep. 28, 2010.

U.S. Appl. No. 12/037,808 Non Final Office Action dated Feb. 17, 2011.

U.S. Appl. No. 12/037,808 Non Final Office Action dated Apr. 27, 2010.

U.S. Appl. No. 12/037,897—Final Office Action dated Jan. 31, 2011.

U.S. Appl. No. 12/037,897 Non Final Office Action dated Sep. 23, 2010.

U.S. Appl. No. 12/037,177; Non Final Office Action dated Apr. 26, 2011.

"IBM z/Architecture Principles of Operation"; Publication No. SA22-7832-05; 6th Edition; Apr. 2007; 1,215 pages separated into 4 Electronic Attachments.

U.S. Appl. No. 12/037,887 Non Final Office Action dated Sep. 24, 2012, 25 pages.

U.S. Appl. No. 12/037,177; Final Office Action dated Jul. 12, 2012, 18 pages.

* cited by examiner

| Mode | Active Zone | Filtering Zone |
|---|---|---|
| Host Mode (including i390) | Zero | Last RZone |
| Guest Mode | RZone | RZone |
| I390 Guest Mode | Zero | RZone |

FIG. 7

SYSTEM, METHOD AND COMPUTER PROGRAM PRODUCT FOR PROVIDING A PROGRAMMABLE QUIESCE FILTERING REGISTER

CROSS-REFERENCE TO RELATED APPLICATION

This application is a continuation of U.S. patent application Ser. No. 12/037,808 filed Feb. 26, 2008, the disclosure of which is incorporated by reference herein in its entirety.

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to processing within a computing environment, and more particularly, to filtering requests by one or more processors of the computing environment.

The processing of a request by one processor of a computing environment may affect one or more other processors of the environment. For example, in a Symmetric Multiprocessing System (SMP) based on the IBM z/Architecture, there are certain broadcast purge operations such as Set Storage Key (SSKE), Invalidate Page Table Entry (IPTE), Invalidate DAT Table Entry (IDTE) and Compare and Swap and Purge (CSP and CSPG) which require all the processors in the system to quiesce in order to observe the system update(s) consistently. Other computer architectures also provide a similar mechanism.

One common implementation for the quiesce purge operation includes the following: 1) all the processors are quiesced (i.e., most normal processing operations are suspended, including accessing the TLB and ALB); 2) any buffered entries in the Translation Look-aside Buffers (TLBs) and/or in the Access-Register-Translation Look-aside Buffer (ALB) which are dependent on the resources being updated are invalidated; 3) the common resource (translation table entry in storage for IPTE, IDTE, CSP or CSPG or a storage key for SSKE) is updated, and 4) finally, the quiesce is released and the processors continue their normal activity. Obviously, this implementation could have a major performance impact, especially for large SMP configurations, since all processors must be quiesced for the duration of the operation. In particular, it is common that one processor is executing a long running instruction that is not interruptible, so that the one processor can not reach the quiesced state for some time. Thus, all other processors are required to wait for this last processor to reach the quiesced state before the steps described above can be completed.

Some strides have been made in the above processing to enhance performance by attempting to quiesce the processors for a shorter period of time. For example, in some implementations when a processor receives a request, it immediately quiesces and then purges the appropriate entries in its own TLB and/or ALB. After the purge is complete, this processor is allowed to continue processing subject to various restrictions. One of these restrictions includes that the processor is not permitted to perform address translation or fetch a storage key but instead must stall until the quiesce is released. Only after the quiesce is released, indicating that the system resources have been updated, are all restrictions removed from the processors.

Further strides to enhance performance are directed to reducing the restriction applied to address translation and key accesses during the quiesce window. For example, after purging its own TLB and/or ALB the purging processor is only restricted, using the page index (PX), segment index (SX) and/or absolute address of the translation, to perform an address translation or key access which potentially uses the system resources being updated by the quiesce operation.

Other performance enhancements have been directed to reducing the number of processors which need to honor the quiesce request. Since 1) the interruption of processors to honor the quiesce request is needed to prevent inconsistent values for translation tables or storage keys from being observed in the middle of an instruction or function and 2) when the active zone on the receiving processor is different from the zone which initiated the quiesce operation, the storage accesses being made by the receiving processor do not use the system resources that are being updated by the initiating zone, there is no need for processors running in a zone different than the quiesce-initiator's zone to be interrupted. This decreases the number of processors that need to be interrupted for a particular quiesce request and, in turn, also decreases the overall time needed to handle the quiesce request since the initiator needs to wait for fewer processors to respond to the interruption request.

Thus, although attempts have been made to reduce the amount of time that processors are quiesced for system resource updates, enhancements are still needed. For example, although fewer processors are required to honor the quiesce interruption, the requirement still exists that processors running in host mode must honor all requests.

BRIEF SUMMARY OF THE INVENTION

Embodiments include a method, system, and computer program product for providing a programmable quiesce filtering register. An aspect of the invention includes storing translation lookaside buffer (TLB) entries are in a TLB1 at the processor. The TLB1 includes entries associated with main storage accesses of programs executing in a guest mode in a current zone and entries associated with main storage accesses of firmware executing in a host mode. A quiesce interruption request is received at the processor. The quiesce interruption request includes a requesting zone indicator, which indicates a zone of the processor that is requesting the quiesce interruption. The processor is either executing in the host mode and has no zone or in the guest mode with the current zone. It is determined if the quiesce interruption request should be filtered by the processor, based on the requesting zone indicator and the contents of a programmable filtering register that indicates exceptions to filtering performed by the processor. If the requesting zone indicator is the same as the current zone associated with the TLB entries, then the quiesce interruption request is filtered based on the requesting zone indicator even after the mode switches from the guest mode to the host mode.

BRIEF DESCRIPTION OF THE DRAWINGS

Referring now to the drawings wherein like elements are numbered alike in the several FIGURES:

FIG. 7 depicts one embodiment for use of a separate filtering zone to be used to filter incoming broadcast purge requests, in accordance with an aspect of the present invention.

DETAILED DESCRIPTION OF EXEMPLARY EMBODIMENTS

An exemplary embodiment of the present invention allows millicode to better specify how filtering is handled by each local processor and, making use of this, further minimize the number of processors that need to honor any given request. This is done by providing more flexibility in filtering by allowing millicode to specify a zone number used solely for filtering and to indicate which commands should be filtered entirely, filtered based on zone or always honored.

In accordance with an aspect of the present invention, a filtering capability is provided which allows the filtering of broadcast purge operations on each receiver to be dependent on the state of the receiving processor. As one example, the filtering is determined based on whether the processor is functioning as a Central Processing Unit (CPU) or as a System Assist Processor (SAP). In another example, the filtering performed is dependent on whether any pageable guest2 entries may exist in the TLBs.

Figure 1:
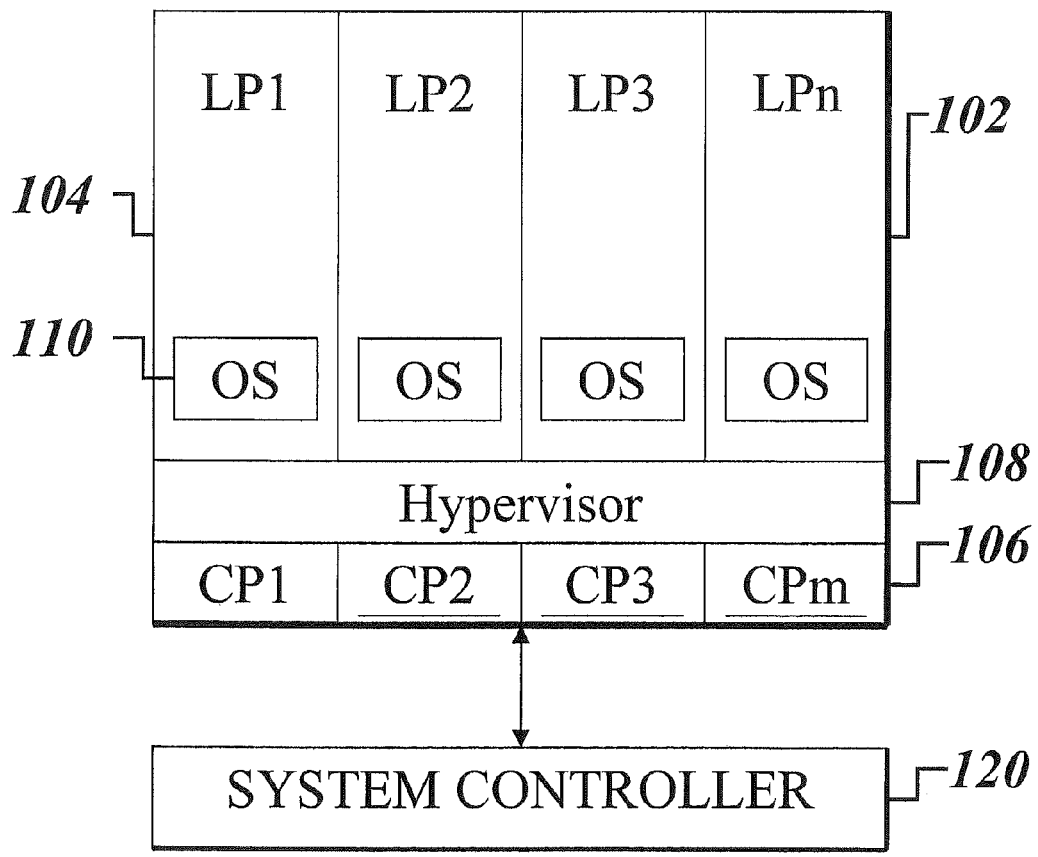
FIG. 1 depicts one embodiment of a computing environment that may be implemented by an exemplary embodiment of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104. In one embodiment, operating system 110 is the z/OS operating system, offered by International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106. One example of hypervisor 108 is the Processor Resource/Systems Manager (PR/SM), offered by International Business Machines Corporation, Armonk, N.Y.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests. Further details are described with reference to FIG. 2.

Figure 2:
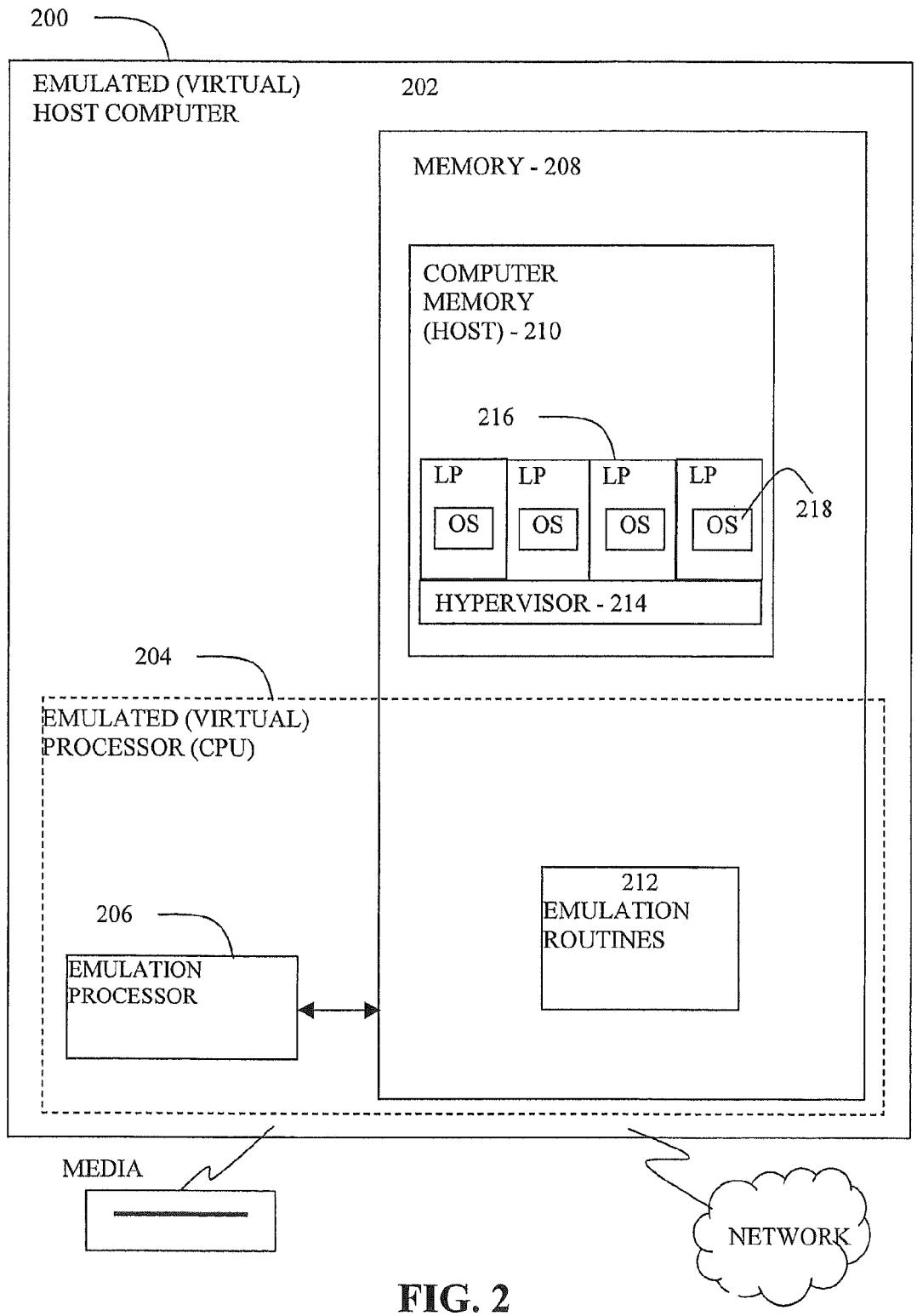
FIG. 2 depicts one embodiment of an emulated computing environment that may be implemented by an exemplary embodiment of the present invention.

Another example of a computing environment to incorporate one or more aspects of the present invention is depicted in FIG. 2. In this example, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

Figure 3:
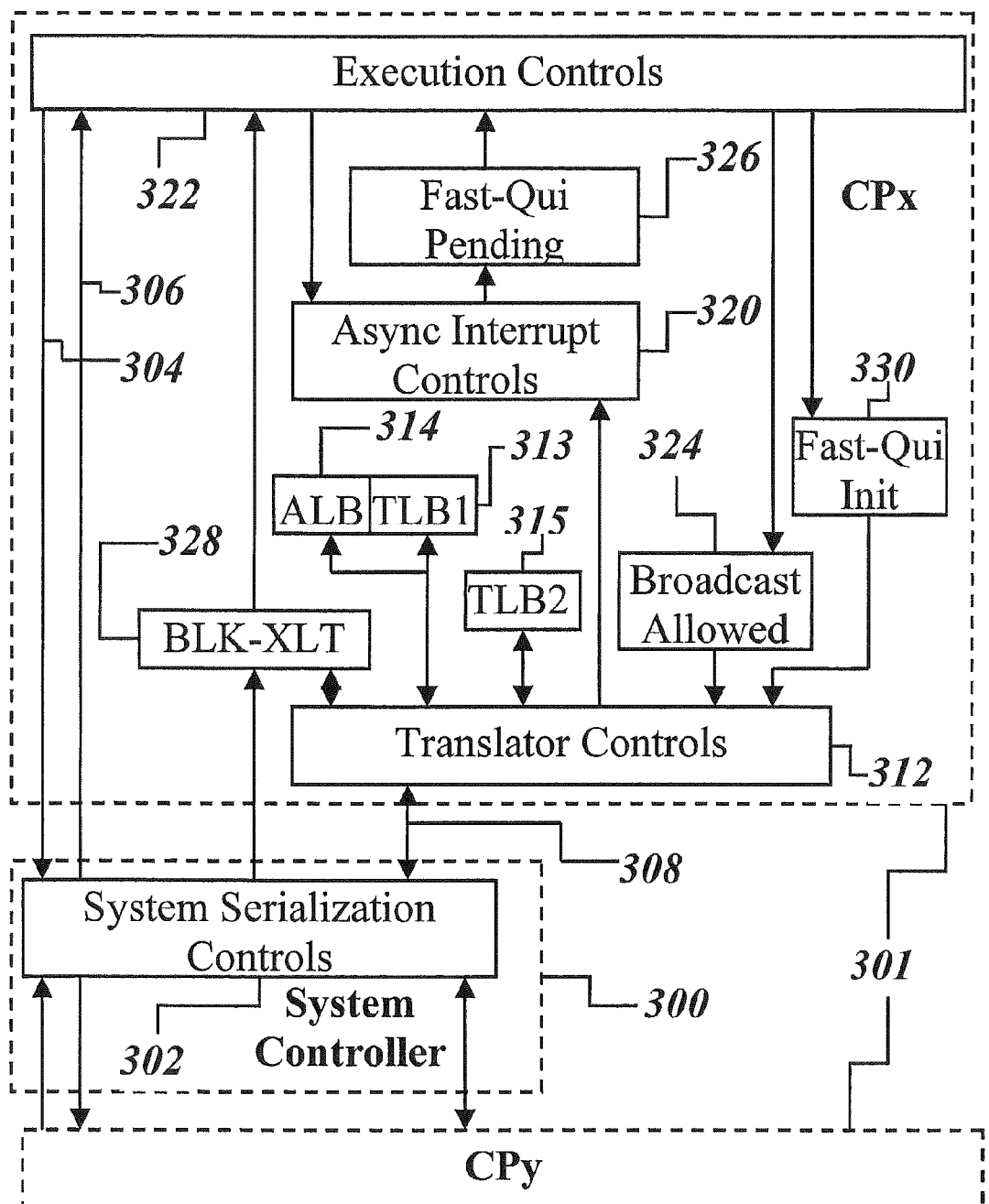
FIG. 3 depicts one embodiment of further details associated with a controller of FIG. 1, in accordance with an aspect of the present invention.

FIG. 3 depicts one example of a system controller 300 coupled to a plurality of central processors (CPUs) 301. In this example, two central processors are depicted. However, it will be understood that more than two processors may be coupled to system controller 300.

System Controller 300 includes various controls including, for instance, system serialization controls 302. The system serialization controls 302 are used to insure that operations that are to be serialized, such as Invalidate Page Table Entry (IPTE), Invalidate DAT Table Entry (IDTE), Set Storage Key Extended (SSKE), or Compare and Swap and Purge (CSP or CSPG) instructions, are serialized, such that only one such instruction is in progress at one time in the computing environment. It also monitors the sequence of events for that operation.

System controller 300 is coupled to each central processor 301 via various interfaces. For instance, an interface 304 to the controller 300 is used by the Licensed Internal Code in a central processor to send "control" commands, which specify an action to be taken, and to send "sense" commands, which return information from the controller 300. Another interface is a response bus 306, which is used to return information from the controller 300 for the "sense" commands. The response bus 306 is also used to communicate command status for "control" commands, and may be set from a plurality of sources within the controller 300, including the system serialization controls 302. A central processor 301 can use this interface to sense the state of the system serialization controls 302 in system controller 300.

A further interface is interface 308, which provides commands to translator controls 312 of central processor 301. Translator controls 312 process commands, in response to the signals. In one example, translator controls 312 process commands that affect one or more buffers, such as Translation Look-aside Buffers (TLBs) 313 and 315 and Access-Register-Translation Look-aside Buffers (ALBs) 314, described in further detail below.

In addition to translator controls 312, central processor 301 includes various other controls, including, for instance, asynchronous interruption controls 320 and execution controls 322. When the translator controls 312 receive a quiesce purge request from the controller 302, translator controls 312 determine whether the request requires an interruption to this processor 301 and if it does, it sends a signal to the asynchronous interruption controls 320. In response to this, asynchronous interrupt controls 320 cause an internal fast-quiesce interruption 326 to be pending in the receiving processor, which in turn, causes execution controls 322 to suspend program instruction processing, at the next interruptible point. In response to the suspension, execution controls 322 invokes a millicode routine to set a broadcast operation allowed latch 324 to enable translator controls 312 to process the pending request. This causes the block-translation (BLK-XLT) latch 328 to be set on all processors 301 besides the fast-quiesce initiator, indicated by latch 330, until the system controller 300 receives the reset fast-quiesce command from the quiesce initiator. The block-translation latch 328 indicates to the translator controls 312 that certain translations (which may be associated with the pending system update) should be held until this latch 328 has dropped.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others.

When PR/SM dispatches a guest (or virtual CPU within a zone) it does this by issuing the Start Interpretive Execution (SIE) instruction. The operand of SIE is a control block, called the state description (SD), which defines the state of that particular guest. Therefore, the state description address can be used as a unique identifier for each virtual CPU within and between the zones.

When the processor is executing instructions for a program running in a zone or partition, it is said to be running in a guest and the zone that is currently executing is called the "active" zone. When the processor is executing instructions on behalf of the PR/SM hypervisor, it is said to be running in the host. Logically, each processor has a smaller TLB1 and a larger TLB2. Millicode guarantees that at any given time the TLB1 and ALB contain entries for only a single zone (or guest). It does this by purging the TLB1s and ALB on entry into the guest, if needed. The TLB2, on the other hand, may contain entries for multiple zones at a time—each being tagged with a zone number and an ID based on the state description to differentiate them.

In the state description, the hypervisor specifies a relocation zone number (RZone) associated with that partition or zone. All virtual CPUs within a given zone will have the same RZone value specified. Therefore, the RZone associated with the guest code that is currently running on any particular physical processor can be used to identify the processors that may be using resources associated with that zone. During entry into any guest, millicode takes the RZone value from the control block and loads it into a hardware register call the Active Zone Number (AZN). The hardware uses the AZN in a number of ways. It is used for tagging entries made in the TLB2 and, therefore, to ensure correct tagging of the TLB2 entries, the AZN must be zero when running in host mode. As already described, in prior art, the hardware also uses the AZN to determine which quiesce purge requests should be filtered by the processor.

The interruption of processors to honor the quiesce request is needed to prevent inconsistent values for translation tables or storage keys from being observed in the middle of an instruction or function. Originally, the quiesce interruption was honored by all processors in the system. In actuality, when the active zone on the receiving processor is different from the zone that initiated the quiesce operation, the storage accesses being made by the receiving processor do not use the system resources that are being updated by the initiating zone. As a result, there is no need for processors running in a zone different than the quiesce-initiator's zone to be interrupted. We refer to this a "zone filtering" and it is accomplished by tagging each quiesce request with a zone number equal to the active zone of the initiator.

Since the TLB1 contains entries for the current zone only, it does not hold any entries relevant to an IPTE, IDTE, CSP or CSPG request from a different zone and, therefore, it does not need to process the invalidation and associated quiesce interruption at all. In the case of an SSKE initiated by a different zone, there may be host entries in the local TLB1 which contain the old key value. The invalidation of these entries, however, can be delayed, as long as it is done before executing any host instructions. Even when running in a different zone than the quiesce initiator, the TLB2 may have entries relevant to the quiesce request, although they are not currently being used. The TLB2 must invalidate the appropriate entries, although when the requesting zone is different from the initiator it may be done in the background, using the provided zone number and other relevant information. This decreases the number of processors that need to be interrupted for a particular quiesce request and, in turn, also decreases the overall time needed to handle the quiesce request since you need to wait for fewer processors to respond to the interruption request.

Figure 4:
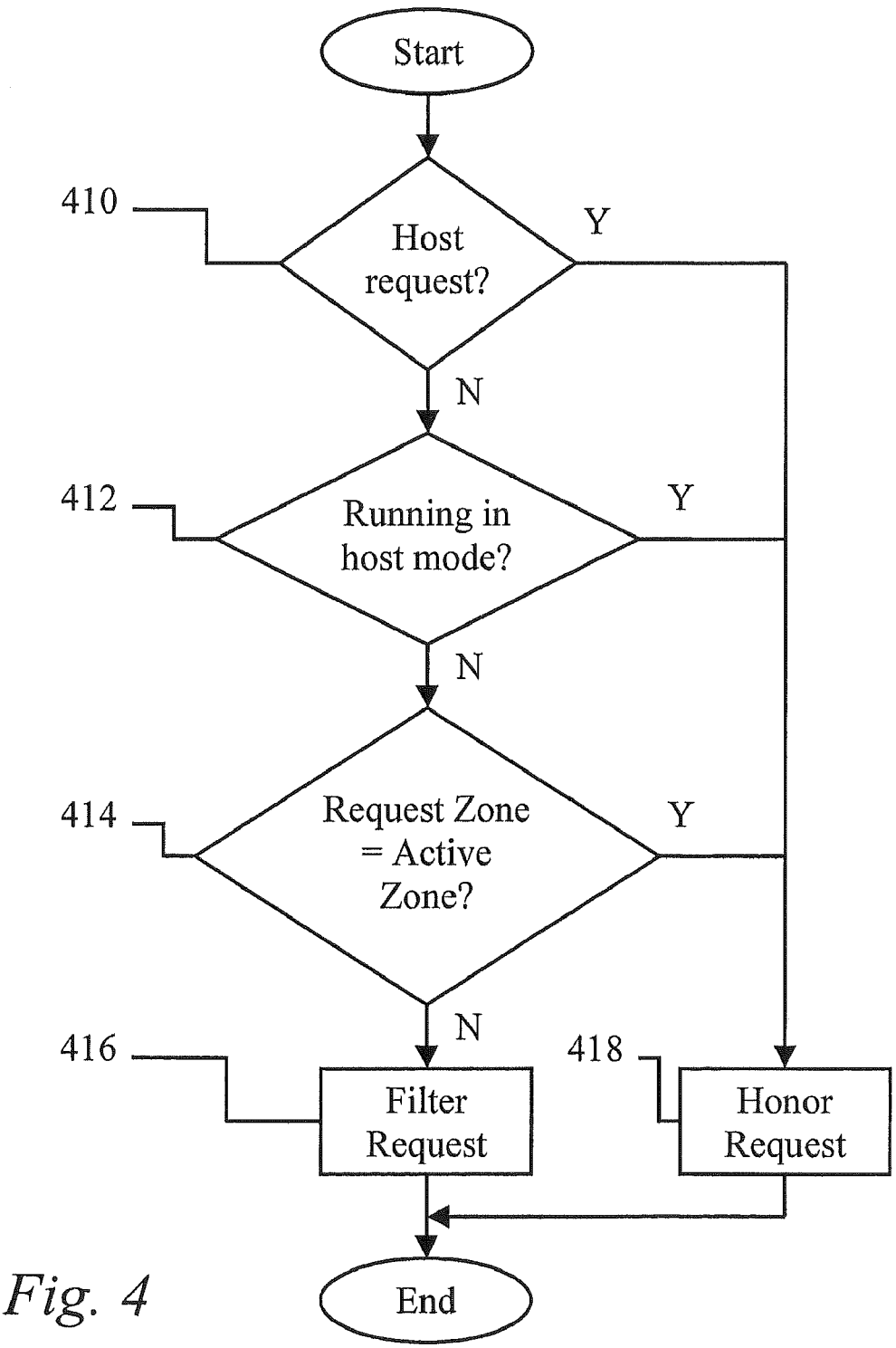
FIG. 4 depicts one embodiment of an algorithm to filter incoming quiesce interruption requests, in accordance with an aspect of the present invention.

FIG. 4 illustrates the algorithm used by the translator to determine if any particular quiesce request can filtered. If 1) the incoming quiesce request is a host request 410, 2) the receiving processor is currently running in host mode 412 or 3) the active zone of the receiving processor matches the active zone of the quiesce initiator 414 then the translator must honor (i.e. can not filter) the quiesce interruption request 418. Otherwise, the processor may filter the request 416.

Figure 5:
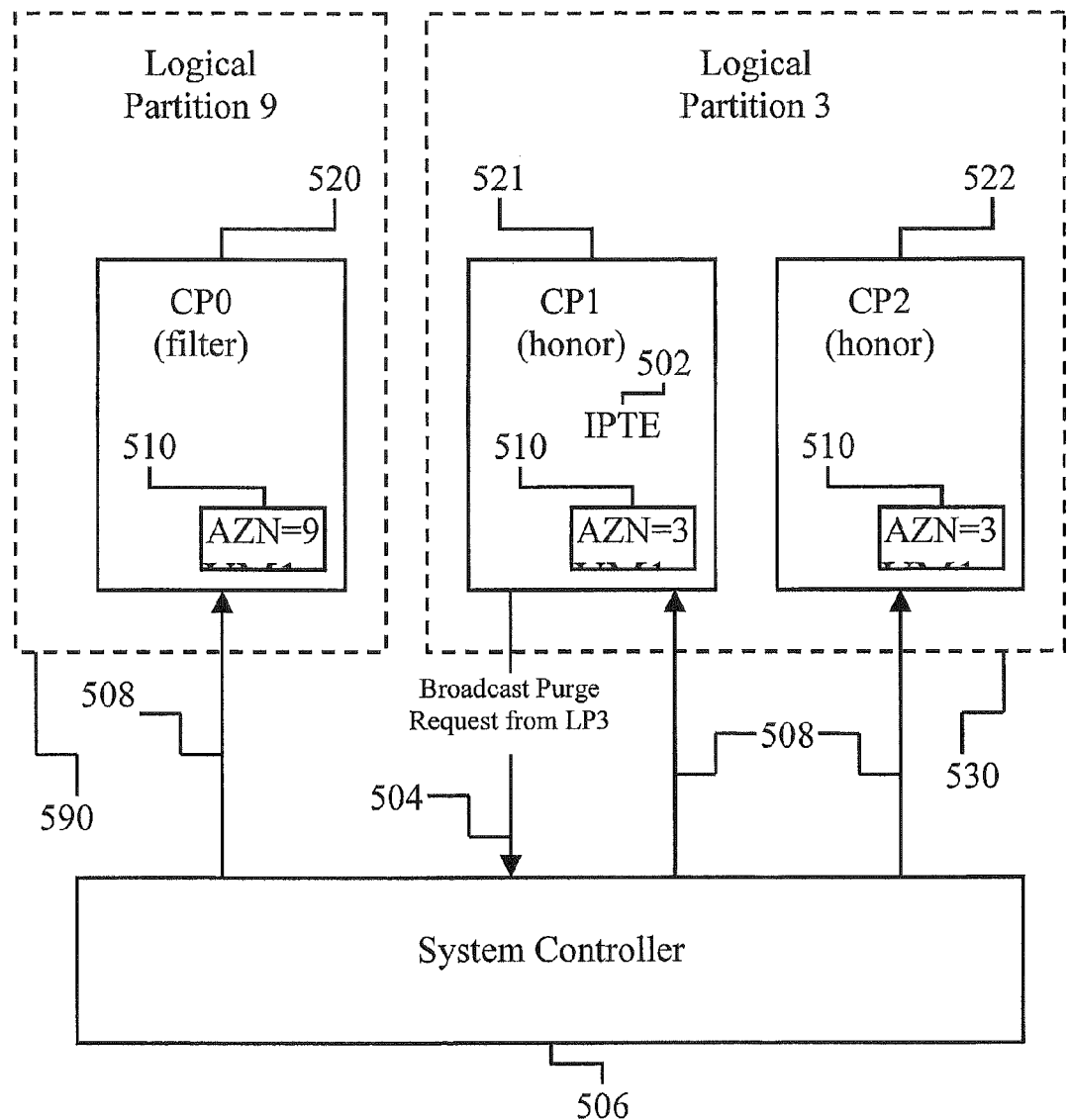
FIG. 5 depicts one embodiment of the flow associated with controlling a system resource update across a computing environment, in accordance with an aspect of the present invention.

In the example illustrated in FIG. 5, there are two logical partitions currently running in the computer environment—Logical Partition 9 (LP9) 590 and Logical Partition 3 (LP3) 530. On each physical processor, there is a register which holds the Active Zone Number (AZN) 510 that corresponds to the partition that is currently running on that processor. CP1, currently running in LP3, executes a quiesce operation (IPTE in this case) 502. That IPTE millicode sends a quiesce request 504, tagged with LP3, to the system controller (SC) 506. The SC then forwards this request, still tagged with LP3, to all the processors in the system 508. In this case, CP0 520 is running a different partition (LP9 590) so the request can be filtered; CP1 521, the quiesce initiator, and CP2 522 are both running in LP3 530 as indicated by the AZN and, therefore, must honor the quiesce interruption request.

The invention adds a millicode filtering register to control the filtering of quiesce requests by the hardware. This was primarily done to decrease the number of quiesce requests which must be honored by a processor that is running in host mode. The first portion of the register provides a Filtering Zone which allows the hardware to continue filtering on a processor that is temporarily put in "host" mode because it is in currently running in i390 mode, and thus in actuality it is still running on behalf or the guest. In addition, the Filtering Zone allows the hardware to continue filtering guest requests based on zone number even after the guest exits to the host. The second portion of the register is a new programmable filtering field so the hardware is able to filter quiesce requests differently on a System Assist Processor (SAP) that is running in host mode than on a CPU that is running in host mode. This portion can also be used to provide flexibility for uncommon cases and workarounds.

Figure 6:
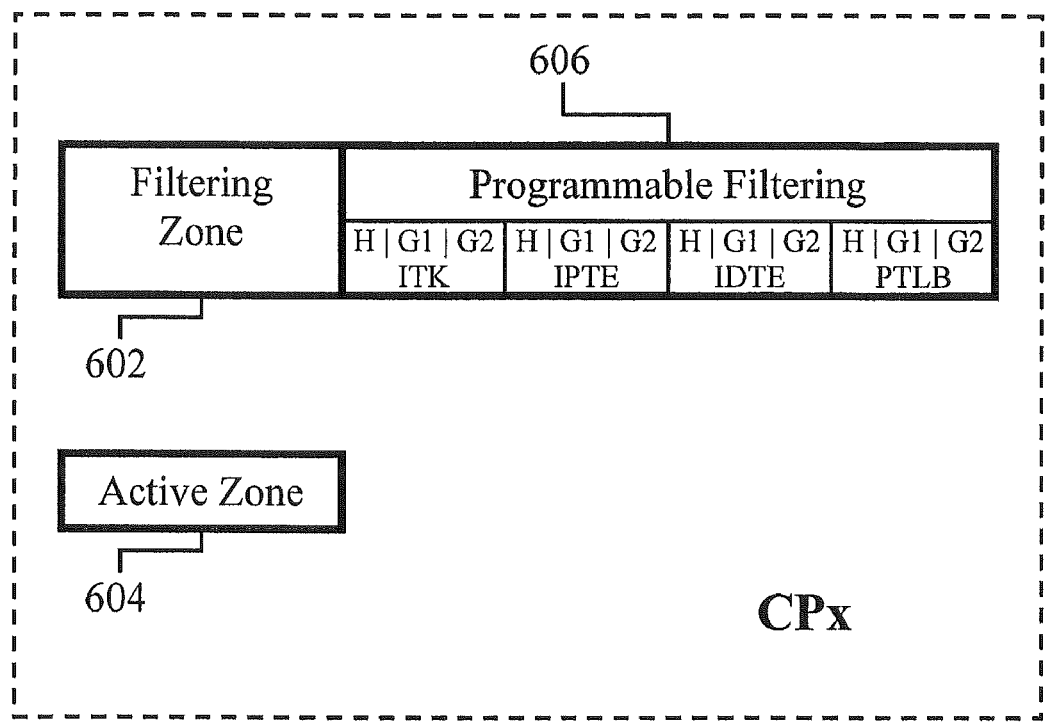
FIG. 6 depicts one embodiment of filtering register programmable by millicode, in accordance with an aspect of the present invention.

As depicted in FIG. 6, an exemplary embodiment of the present invention provides a new field, referred to as the Filtering Zone (FZone) 602, which is used only to determine which quiesce interruption requests are filtered by the processor. This allows for the Filtering Zone 602 to differ from the Active Zone 604. This change is beneficial when the processor is running in a host after it had been running in a guest partition. In this case, it is still true that the only guest entries which exist in the TLB1 are for the last guest and its associated zone. In other words, the processor can continue to filter incoming guest requests for IPTE, IDTE, CSP and CSPG based on the zone number of the last guest that was running.

Another instance where the new FZone register is valuable is when running in i390 mode under SIE. i390 code is Licensed Internal Code (LIC) which runs on z-series machines. When a processor is acting as a CPU and executing instructions, there are times when the processor is put from millicode mode into i390 mode. This is done during certain instructions or functions that need to be handled by i390 code. When a CPU which is running in guest mode is required to enter i390 mode, from a hardware perspective, it is temporarily placed into host mode and the AZN is set to zero. One reason this is done is to allow address translations to be performed correctly and for the associated TLB entries to be tagged correctly. Even when this guest is running in i390, since the i390 code is still executing on behalf of the original zone, the only guest TLB1 entries that exist are for the active zone. The programmable register allows the i390 code to run in host mode but still filter quiesce requests based on the filtering zone number. The SAP is always running in i390 mode, but that case is handled separately using the programmable filtering as described below, since no guest entries exist in its TLBs. The table in FIG. 7 indicates the value of the FZone and the AZN regs, and how they differ, in these various modes as is described in more detail below.

In addition to the FZone register, an exemplary embodiment of the present invention also provides programmable quiesce filtering fields 606 in the programmable filtering register as depicted in FIG. 6. In one embodiment, this register allows millicode to determine if zone-based filtering will be applied by the processor hardware to incoming quiesce requests, if all requests will be honored or if all requests will be filtered. In one embodiment, this register provides the ability to specify filtering based on the SIE level (host or guest) and type of the incoming request. For example, a host Invalidate TLB Key (ITK), used by the SSKE instruction, can be filtered differently then a guest ITK or a host IPTE command.

The System Assist Processor (SAP) always runs in host mode. The SAP, however, is never running hypervisor code and, therefore, in general is not making accesses to guest storage. This means its TLBs don't contain any entries that pertain to guest translation tables or keys. This eliminates the need to honor any guest IPTE, IDTE, CSP, CSPG or SSKE instruction on a SAP. The addition of a programmable quiesce register allows millicode, based on use of the PU as either a SAP or a CPU, to determine if the guest quiesce requests should be filtered or not. In addition, it allows for the dynamic reconfiguring of a processor from a SAP to a CPU to update this value appropriately.

This programmable register provides millicode with the ability to change the filtering register for small windows of time, for instance when one zone is making translations on behalf of a different zone. This allows the performance to be optimized for the common case while still being able to operate correctly for the rare case which might not have been evident until later in the design phase. This register also allows millicode to provide temporary workarounds which allow for testing to continue on prototype machines.

FIG. 7 depicts different modes and the corresponding settings of the active zone register (AZN) and the filtering zone register (FZone) that may be implemented by an exemplary embodiment of the present invention. The table in FIG. 7 is an example, other combinations may be implemented by alternate embodiments. As shown in FIG. 7, when the processor is running in host mode (including i390), the AZN is zero and the FZone remains equal to the Relocation Zone (RZone) of the last guest that ran on this physical processor. When the processor is running in guest mode, the AZN and the FZone are both equal to the RZone of the partition which is running. When the processor is running in i390 guest mode, the AZN is zero and the FZone is equal to the RZone of the guest that is currently executing on this processor.

Technical effects and benefits include the ability to filter broadcast purge operations on receiving processors based on the state of the receiving processor. This may lead to an increase in throughput and/or performance on the processors due to a decrease in the amount of time spent by the processors performing quiesce requests.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. The capabilities of the present invention can be implemented in software, firmware, hardware or some combination thereof. For example, embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for filtering quiesce interruption requests at a processor, the method comprising:
    storing translation lookaside buffer (TLB) entries in a TLB1 at the processor, the TLB1 comprising entries associated with main storage accesses of programs executing in a guest mode in a current zone and entries associated with main storage accesses of firmware executing in a host mode;
    receiving a quiesce interruption request at the processor, the quiesce interruption request comprising a requesting zone indicator indicating a zone of the processor requesting the quiesce interruption, the processor executing in the host mode having no zone or the guest mode having the current zone;
    determining that the quiesce interruption request should be filtered by the processor, the determining responsive to the requesting zone indicator and to contents of a programmable filtering register for indicating exceptions to filtering performed by the processor; and
    responsive to the requesting zone indicator being the same as the current zone associated with the TLB entries, filtering the quiesce interruption request, wherein one or more quiesce interruption requests are filtered based on the requesting zone indicator even after the mode switches from the guest mode to the host mode.

2. The method of claim 1 further comprising responding to the quiesce interruption request in response to determining that the quiesce interruption request cannot be filtered.

3. The method of claim 1 wherein contents of the programmable filtering register are updatable by code executing on the processor.

4. The method of claim 1 wherein the quiesce interruption request is associated with a type and the determining is further responsive to the type.

5. The method of claim 1 wherein the quiesce interruption request is associated with a Start Interpretive Execution (SIE) level and the determining is further responsive to the SIE level.

6. The method of claim 1 wherein an active zone register is different than a filtering zone register.

7. The method of claim 1 wherein the processor is executing in the host mode and the filtering zone is associated with a previous guest mode of execution of the processor.

8. The method of claim 1 wherein when the processor is executing as a specialty engine it utilizes one or more of a different filtering zone and a different programmable filtering register contents than when the processor is executing as a central processing unit (CPU).

9. A system for filtering quiesce interruption requests at a receiving processor, the system comprising:
    a programmable filtering register indicating exceptions to filtering performed by the receiving processor; and
    a translator circuit in communication with the programmable filtering register, the translator circuit configured to perform a method comprising:
    storing translation lookaside buffer (TLB) entries in a TLB1 at the receiving processor, the TLB1 comprising entries associated with main storage accesses of programs executing in a guest mode in a current zone and entries associated with main storage accesses of firmware executing in a host mode;
    receiving a quiesce interruption request at the receiving processor, the quiesce interruption request comprising a requesting zone indicator indicating a zone of the receiving processor requesting the quiesce interruption, the receiving processor executing in the host mode having no zone or the guest mode having the current zone;
    determining that the quiesce interruption request should be filtered by the receiving processor, the determining responsive to the requesting zone indicator and to contents of the programmable filtering register for indicating exceptions to filtering performed by the receiving processor; and responsive to the requesting zone indicator being the same as the current zone associated with the TLB entries, filtering the quiesce interruption request, wherein one or more quiesce interruption requests are filtered based on the requesting zone indicator even after the mode switches from the guest mode to the host mode.

10. The system of claim 9 wherein the method further comprises responding to the quiesce interruption request in response to determining that the quiesce interruption request cannot be filtered.

11. The system of claim 9 wherein contents of the programmable filtering register are updatable by code executing on the receiving processor.

12. The system of claim 9 wherein the quiesce interruption request is associated with a type and the determining is further responsive to the type.

13. The system of claim 9 wherein the quiesce interruption request is associated with a Start Interpretive Execution (SIE) level and the determining is further responsive to the SIE level.

14. The system of claim 9 wherein an active zone is different than a filtering zone.

15. The system of claim 9 wherein the receiving processor is executing in the host mode and the filtering zone is associated with a previous guest mode of execution of the receiving processor.

16. The system of claim 9 wherein when the receiving processor is executing as a specialty engine it utilizes one or more a different filtering zone and a different programmable filtering register contents than when the receiving processor is executing as a CPU.

17. A computer program product for filtering quiesce interruption requests at a processor, the computer program product comprising:
  a tangible storage medium readable by a processing circuit and storing instructions for execution by the processing circuit for performing a method comprising:
    storing translation lookaside buffer (TLB) entries in a TLB1 at the processor, the TLB1 comprising entries associated with main storage accesses of programs executing in a guest mode in a current zone and entries associated with main storage accesses of firmware executing in a host mode;
    receiving a quiesce interruption request at the processor, the quiesce interruption request comprising a requesting zone indicator indicating a zone of the processor requesting the quiesce interruption, the processor executing in the host mode having no zone or the guest mode having the current zone;
    determining that the quiesce interruption request should be filtered by the processor, the determining responsive to the requesting zone indicator and to contents of a programmable filtering register for indicating exceptions to filtering performed by the processor; and
    responsive to the requesting zone indicator being the same as the current zone associated with the TLB entries, filtering the quiesce interruption request, wherein one or more quiesce interruption requests are filtered based on the requesting zone indicator even after the mode switches from the guest mode to the host mode.

18. The computer program product of claim 17 wherein the quiesce interruption request is associated with a type and the determining is further responsive to the type.

19. The computer program product of claim 17 wherein the quiesce interruption request is associated with a Start Interpretive Execution (SIE) level and the determining is further responsive to the SIE level.

20. The computer program product of claim 17 wherein an active zone is different than a filtering zone.

* * * * *